CABINETS FOR ELECTRONIC EQUIPMENT

Filed Sept. 25, 1953 3 Sheets-Sheet 1

INVENTOR
JOHN S. KENDRICK
BY Elmer J. Gorn
ATTORNEY

June 30, 1959 J. S. KENDRICK 2,893,000

CABINETS FOR ELECTRONIC EQUIPMENT

Filed Sept. 25, 1953 3 Sheets-Sheet 2

INVENTOR
JOHN S. KENDRICK
BY Elmer J. Gorn
ATTORNEY

INVENTOR
JOHN S. KENDRICK
BY Elmer J. Gorn
ATTORNEY

United States Patent Office 2,893,000
Patented June 30, 1959

2,893,000

CABINETS FOR ELECTRONIC EQUIPMENT

John S. Kendrick, Concord, Mass., assignor to Raytheon Manufacturing Company, Newton, Mass., a corporation of Delaware Application September 25, 1953, Serial No. 382,292

8 Claims. (Cl. 340—367)

This invention relates to a cabinet for electronic equipment, and specifically to a cabinet for radar equipment utilizing visual display tubes.

In the assembly of radar indicators requiring the use of a visual display tube, such as a cathode ray tube, it is necessary to provide the tube and its associated electronic components with a cabinet which will protect the equipment from damage. Likewise, it is equally important for the cabinet to be constructed so these components are readily accessible for servicing and testing. It is known that the electronic components comprising a radar indicator may be mounted on a chassis which is completely enclosed in a suitable cabinet. However, to service these components, it is often necessary to either remove a front panel from the cabinet, open a cabinet door, or draw out a chassis front panel assembly. In addition, it may be necessary to disconnect the front panel control knobs and the cables leading into the equipment in order to disengage the chassis from the cabinet. Furthermore, equipment of this type is limited in the way in which it can be mounted, and in most instances the equipment is bolted to a horizontal supporting structure, such as to a table or to the floor.

This invention involves a novel cabinet structure for electronic equipment, such as a radar indicator, wherein a box-like chassis section open on the bottom side is utilized. This chassis serves a triple purpose, that is, as a chassis, as a front panel control section, and as a body section of the cabinet wherein substantially all of the electronic components associated with the indicator are housed and supported. In other words, the chassis is actually the center section of the cabinet itself, rather than a separate unit mounted within the cabinet. The components mounted on the upper surface of this chassis are enclosed and protected by a removable cover which is, in turn, connected along the edges thereof to the chassis. This cover is provided with a reflection plotter through which the display tube can be observed.

The lower longitudinal edges of the chassis section of the cabinet are each pivotally connected with interlocking hinges to a base pan which serves not only as a cover for the open side of the chassis but also as a mounting plate for the entire assembly. To service those electronic components which are internally mounted in the chassis section, the hinges on either side of the chassis section are unlocked while the other set of hinges is engaged. Thus, the bottom side of the chassis can be exposed by turning it on its side, and the components therein can be serviced from either of two sides when the equipment is operably mounted. Since the cables leading to the antenna and the transmitter are directly connected to a rear section of the chassis, servicing operations can be completed without removing any cables, knobs or panels, and without disassembling the chassis or the cabinet. It should also be noted that the cover can be easily removed when the equipment is operably mounted if it is necessary to replace the tubes and service other parts which are connected to the upper surface of the chassis. Furthermore, since all of the electronic components are supported on and wired within the chassis section of the cabinet as one assembly, the difficulties encountered in assembling such equipment are greately decreased.

Another feature of the cabinet assembly described above lies in the orientation of the front panels of the cabinet. The front panel of the chassis where the control knobs are located and the corresponding front wall of the cover wherein the reflection plotter is mounted, as well as the face of the tube itself, are inclined toward the rear of the equipment at substantially the same angle. Thus, it is possible to mount the entire indicator unit so the display tube can be observed in either of three operable positions. For example, it can be mounted in a horizontal position, as on a table, in a vertical position with the base pan mounted on a wall or bulkhead, or in an upside down position with the base pan mounted on an overhead structure. To incline the face of the tube at the proper angle and still retain a compact chassis assembly, the display tube is mounted on and extended through the upper surface of the chassis section. Thus, the pins and socket connections associated with this tube are located on the inside of the chassis. This is in accordance with the feature previously described wherein the wiring and connections to the electronic components are concentrated on the inside of the chassis body to facilitate servicing operations.

A further feature of this novel cabinet assembly is a substantially peripheral lip which extends around the edges of the base pan. Thus, when the cabinet is closed this lip is telescopically disposed within the chassis and lies in a position adjacent to the lower edges of the chassis. The lip protects the components within the chassis from the deleterious effects of moisture and also provides the chassis with openings through which the heated air therein may be exhausted. The base pan is also provided with an arm which is pivotally connected at one end to the floor of the pan and at the other end to a locking device which can be connected to a lower edge of the chassis when it is in an open position. This arm is utilized to prevent the chassis from swinging or closing when the components are being serviced.

This invention and the features thereof will be understood more clearly and fully from the following detailed description of one embodiment of the invention with reference to the accompanying drawings, wherein.

Figures 1, 2, 3:
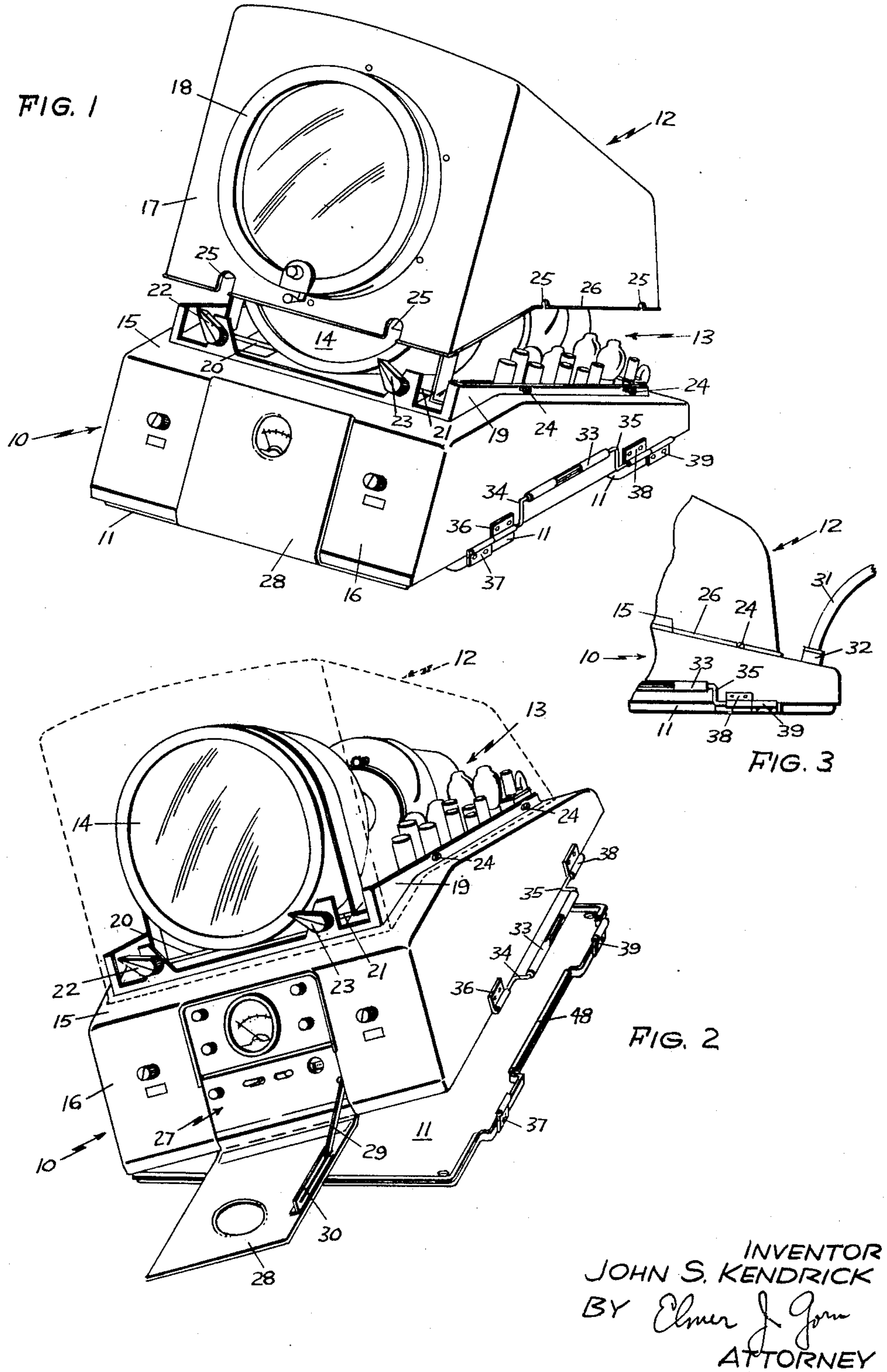
Fig. 1 is an isometric view of a cabinet for a radar indicator made in accordance with this invention.
Fig. 2 is an isometric view of the cabinet in a partially opened position with a dotted section illustrating the area enclosed by the cover.
Fig. 3 is a partial side view of the cabinet.

Referring now to Figs. 1, 2 and 3, a cabinet made in accordance with this invention is shown. As previously mentioned the invention as described herein depicts the cabinet as it can be used to house a radar indicator. The cabinet consists primarily of a chassis section 10, a base pan 11 enclosing the open or bottom side of the chassis section and a cover 12. The cover is designed to fit over a plurality of electronic components 13 which include a visual display tube 14, such as the cathode ray tube shown. The chassis section 10 is a substantially box-like structure the bottom side of which is open. It should be noted that the upper surface 15 of the chassis section where the components 14 are mounted sloped downward toward the rear of the chassis section 10. Likewise, the front control panel 16 of the chassis section and the front wall 17 of the cover 12 are inclined toward the rear of the cabinet. The front wall 17 is also provided with a reflection plotter 18 for viewing the tube 14. The advantages gained from inclining the front control panel 16 and the front wall 17 of the cover toward the rear of the equipment are discussed in more detail below.

A peripheral wall 19, which defines the boundries of the upper surface 15 of the chassis section 10, is adapted to support the ends of the control shafts 20 and 21 and the control knobs 22 and 23 affixed thereto. The wall 19 is also provided with a set of four screws 24, two of which are threaded into each of the longitudinal sides of this wall. The cover 12 is constructed with a series of six slots 25 adjacent to and opening along the flanged edge 26 of the cover. The cover can be placed in a position adjacent to the wall 19 and behind the knobs 22 and 23 and the heads of the screws 24. This cover is shown as it appears when operably mounted in Figs. 9, 10 and 11 and the screws 24 are shown therein as they appear when threaded into place. Thus, the screws 24 cooperate with the edge 26 to hold the cover in place. The cover 12 and the peripheral wall 19 of the chassis section 10 prevent moisture and dust from adversely effecting the components 13. Also, it should be noted that the cover may be easily removed to service the components 13 without disturbing the equipment when it is operating.

The front control panel 16 has a recessed control section 27 which is centrally located therein as shown in Fig. 2. This recessed section is adapted to receive a number of control knobs, switches and a dial, all of which can be covered by a door 28 when they are not being utilized. The door 28 is connected with a hinge to the lower edge of the front panel 16 and is supported by an arm 29. This arm is connected at one end to a side of the recessed section 27 and at the other end to a slotted flange 30 which is, in turn, affixed to the door 28.

A rear section of the chassis 10 and the cover 12 is illustrated in the partial side view shown in Fig. 3. It may be seen that the chassis extends beyond the area enclosed by the cover so that a cable 31, such as those used to connect the antenna and transmitter to the indicator, can be tied directly to a jack 32 on the upper surface 15 of the chassis section rather than having to pass them through an opening in the cabinet first and then to a jack on the chassis. This rear section of the chassis is also used as a mounting panel for other components, such as fuses and other cable jacks, not shown, which should also be readily accessible and need not be enclosed.

Figure 5:
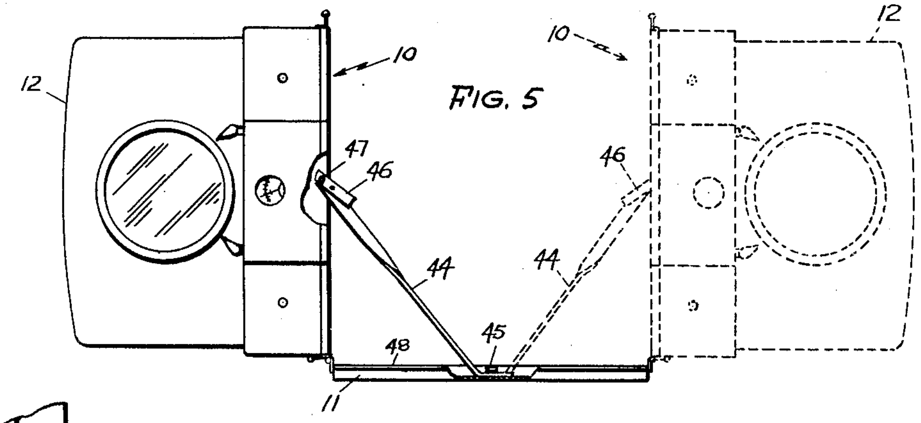
Fig. 5 is a front view of the cabinet supported in an open position and a dotted front view illustrating an alternate open position.

Referring again to Figs. 1, 2 and 3, an internally threaded handle 33, a pair of rods 34 and 35 threaded into opposite ends of the handle and a set of disengageable hinges 36, 37, 38 and 39 are shown. A similar arrangement is also assembled on the opposite side of the cabinet as may be seen with reference to Fig. 5. The function of these components is illustrated in Fig. 1, 2 and 5 wherein the chassis section 10 and the base pan 11 are illustrated as they appear when they are joined, separated and in an open position, respectively. Thus, in Fig. 1 the rods 34 and 35 are extended so they fit into the openings provided in the hinges thereby locking the base pan 11 to the chassis section 10. In Fig. 2, the handle 33 has been rotated, the internal threading arrangement has partially drawn the rods 34 and 35 into the handle and removed them from hinges 37 and 39, and the chassis section 10 is in an intermediate position before being turned onto its side to service those of the components located herein. Fig. 5 shows the chassis section turned on its side and a dotted view of the equipment illustrates the alternate open position which the chassis section can assume if the hinges on the left side are disengaged rather than those on the right side. Thus, it may be seen that the internal components can be serviced from either side of the cabinet when it is operably mounted.

Figure 4:
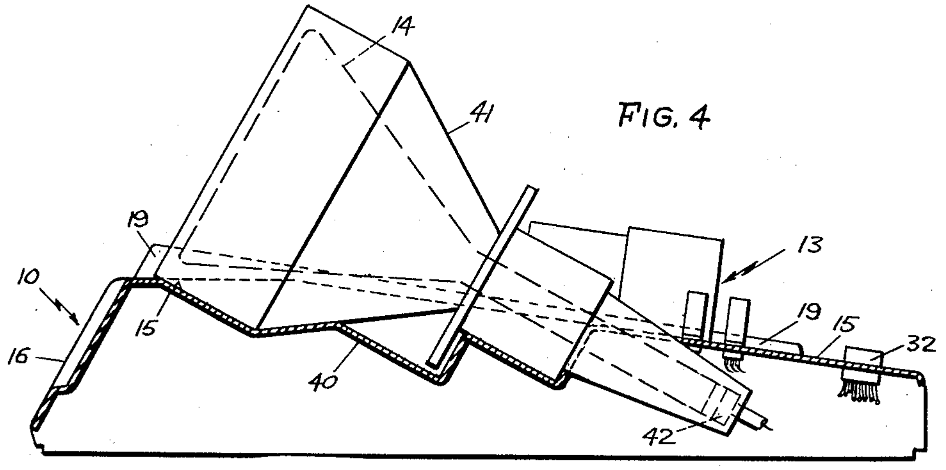
Fig. 4 is a cross-sectional view of the chassis section of the cabinet taken along the longitudinal axis thereof.

As previously mentioned, the front surfaces 16 and 17 of the cover and the chassis section have been inclined toward the rear of the cabinet assembly. The visual display tube 14 is likewise inclined at substantially the same angle as these surfaces so that the equipment can be observed and operated from three positions. To accomplish this result, to save space and to keep the tube socket and connections within the chassis section, the upper surface 15 of the chassis section is designed with a step-like recess 40 on which the display tube 14 is supported and through which an end section of the tube extends. Referring now to Fig. 4 a cross-sectional view taken through the middle of the upper surface 15 of the chassis section is shown. The tube 14 is surrounded by a shield 41 and, in this particular embodiment of the invention, it is this shield which actually rests on the upper surface of the chassis section. The rear section of the tube and the shield extend through an opening in the recess 40 and protrude into the chassis section 10 so that a socket 42 for this tube and suitable connections thereto can be made on the inside of the chassis section. It should be noted that this step-like recess is designed to incline the screen or face of the tube 14 at substantially the same angle as that of the front surfaces 16 and 17 of the chassis section and cover, respectively.

Figure 9:
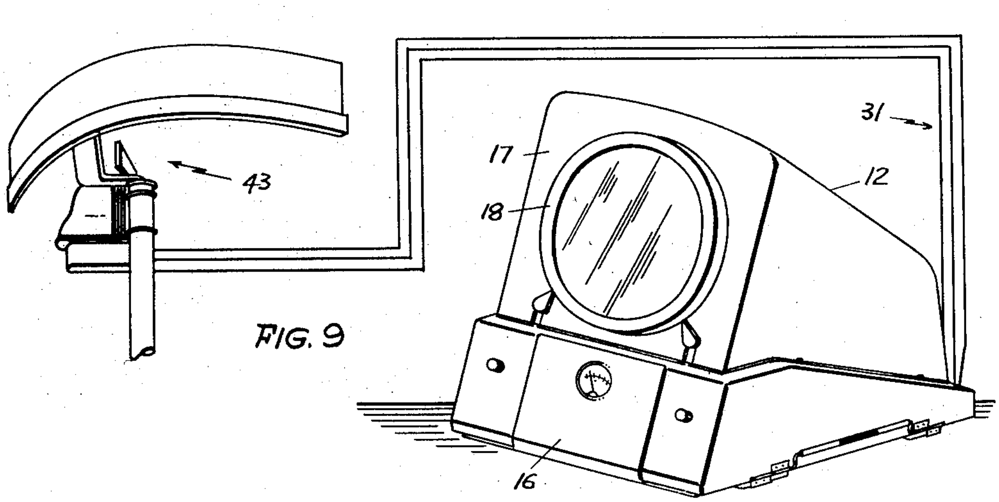
Fig. 9 is a view of the indicator cabinet assembly mounted in a horizontal position and electrically connected to an antenna-transmitter structure.
Figures 10, 11:
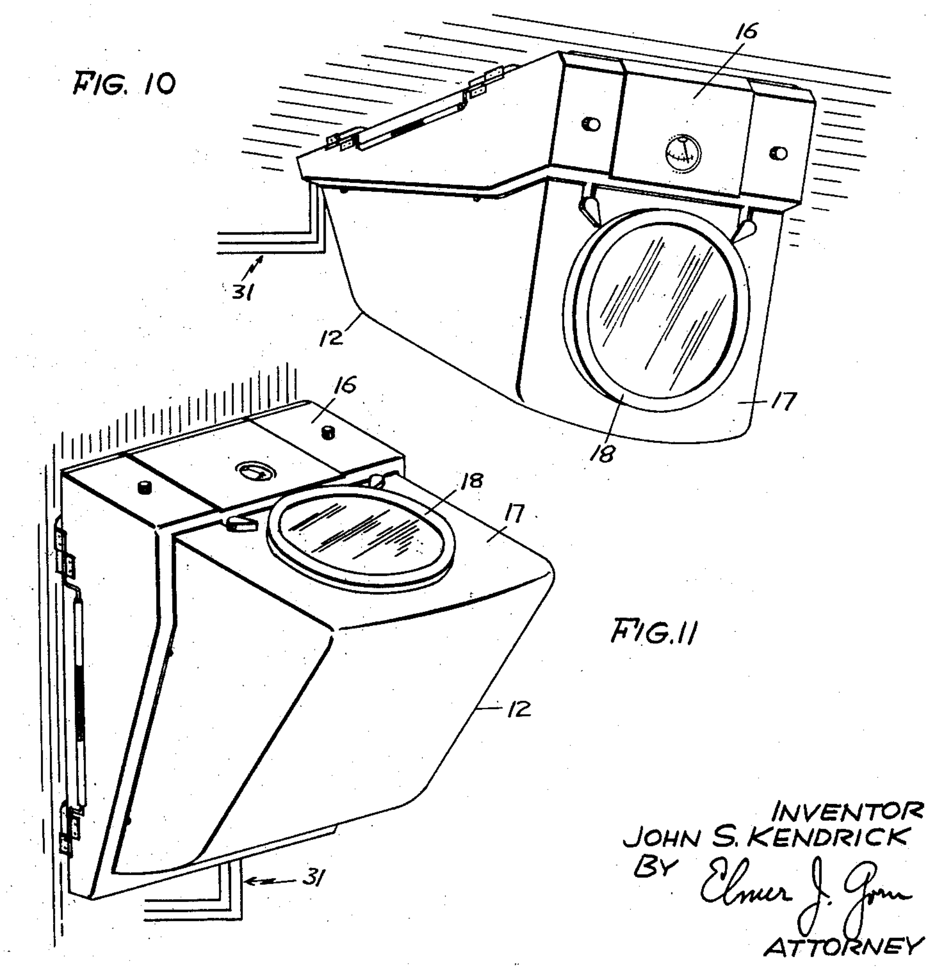
Fig. 10 is a view of the indicator cabinet assembly mounted on an overhead structure.
Fig. 11 is a view of the indicator cabinet assembly mounted in a vertical position.

By referring now to Figs. 9, 10 and 11, the advantage of properly orienting the tube, the reflection plotter 18 and the front control panel 16 can be observed. For example, an indicator assembly of the type described herein is readily adaptable for use in small boats where space is at a premium. Therefore, it is often desirable to be able to mount the indicator unit in any of the three positions shown in Figs. 9, 10 and 11. Therefore, this assembly can be mounted in a horizontal position as illustrated in Fig. 9, in an overhead position as illustrated in Fig. 10 or in a vertical position, as against a bulkhead, for example, as illustrated in Fig. 11. In each of these figures it is apparent that the control panel 16 is readily accessible and the screen of the tube can be easily seen due to the orientation of the sloping front surfaces of the cabinet. Also the advantages obtained from the interlocking hinges connecting the chassis section to the base pan and the removable cover can be more fully understood when it is realized that the equipment as shown in Figs. 9, 10 and 11 can be serviced both internally and externally when the equipment is operating The cable 31, previously discussed with reference to Fig. 3, is shown schematically in Figs. 9, 10 and 11 and is connected in each instance to a suitable antenna-transmitter structure 43, for example, to complete a radar equipment suited for shipboard operation.

Figures 6, 7:
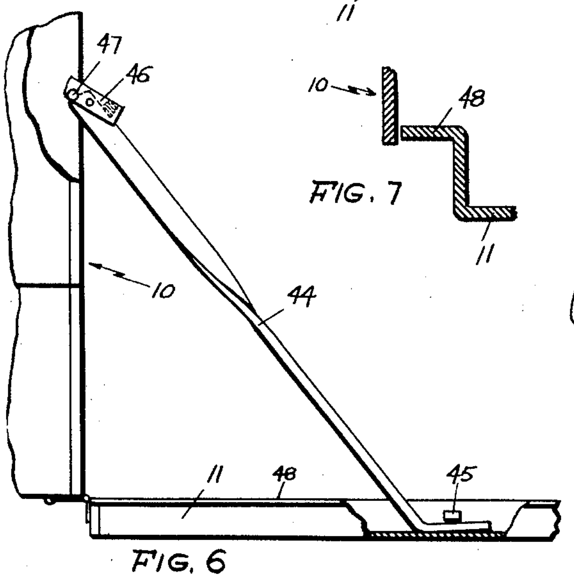
Fig. 6 is a broken away section of the chassis illustrating the function of the supporting arm and locking device.
Fig. 7 is a partial cross-sectional view of the base pan and the adjacent edge of the chassis.

Referring now to Figs. 5 and 6 an arm 44 which is pivotally connected at one end and to a bolt 45 on the floor of base pan 11 and is equipped with a spring lock 46 at the other end is shown. The lock 46 is adapted to grasp a pin 47 affixed to the rear edge of the open side of the chassis section 10 so that this section can be securely held in either of the two open positions shown in Fig. 5. The advantage obtained from this arm can be fully appreciated when the equipment is supported in an overhead position, for example, and it is necessary to serve the internal components in the chassis section when the indicator is operably mounted. Thus, the arm 44 can be utilized to prevent the chassis section from swinging when it is being serviced in this position.

Figure 8:
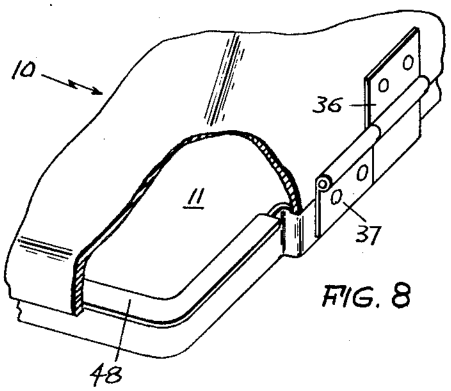
Fig. 8 is a broken away section of one corner of the cabinet.

It should also be noted that the edges of the base pan 11 are provided with a peripheral lip 48 which can be seen in Figs. 2, 7 and 8. This lip is telescopically disposed adjacent to the edges of the open side of the chassis section 10, as shown in a broken away section in Fig. 8 and in the detailed cross section shown in Fig. 7. The lip 48 is slightly separated from the edge of the chassis section to provide an opening through which heat within this section can be dissipated. It also aids in preventing moisture from entering the chassis section.

However, it should be understood that this invention is not limited to the particular details described above, as many equivalents will suggest themselves to those skilled in the art. For example, the lower edges of the cover could be connected to the sides of the chassis section rather than to the upper edge of this section. Likewise, it may be desirable to use other means than hinges to join the chassis section to the base pan. Furthermore, the hinges utilized in this embodiment of the invention could be located at the bottom of the front control panel of the chassis section as well as on the side edges of this section. Therefore, it is desired that the appended claims be given a broad interpretation commensurate with the scope of the invention within the art.

What is claimed is:

1. A substantially frusto-conical device having a display surface at one end, a supporting body having a horizontal base, means for securing said substantially frusto-conical device to said body in a position such that said display surface is disposed obliquely to the plane of said horizontally disposed base, and a hood-shaped four-sided closure element having its lower peripheral edges engageable with the upper peripheral edges of said body, and also having one of its four sides of transparent material to facilitate viewing of the display surface of said substantially frusto-conical device from a plurality of operable mounting positions.

2. A device of substantially tapering contour having a display surface at one end, a supporting body having a substantially horizontally disposed base, means for securing said tapering device to said body in a position causing said display surface to extend obliquely away from the horizontally disposed base of said body, and a hood-shaped closure element enveloping said tapering device, said closure element being transparent at the area nearest to the display surface, whereby said display surface can be easily viewed when said device is mounted in a plurality of operable mounting positions.

3. A device of substantially tapering contour having a display surface at one end, a supporting body having a substantially flat base, means for securing said tapering device to said body in a position causing said display surface to extend obliquely away from the horizontally disposed base of said body, and a hood-shaped closure element enveloping said tapering device, said closure element being transparent at the area nearest to said display surface to facilitate servicing of said device from a plurality of directions when said device is operably mounted.

4. An exhibiting device having a display surface at one end, a supporting base, an intermediate body hinged to said base, means for securing said exhibiting device to said body, and a multi-sided hood enveloping said exhibiting device and resting on said supporting body, said hood having one of its sides of transparent material to facilitate viewing of said display surface from a plurality of operable mounting positions.

5. An exhibiting device having a sloping exhibiting surface, an enclosing hood having one side sloping at an angle corresponding to the slope of said sloping exhibiting surface, said side including a transparent area adjacent said exhibiting surface, and a supporting base having two parallel sets of bearing elements facilitating a predetermined degree of rotation of said exhibiting device about either of two parallel axes to facilitate servicing of said exhibiting device from a plurality of directions when the device is operably mounted in at least two mounting positions.

6. A tapering exhibiting device having a display surface at its wider end, an enclosing hood having a transparent area adjacent said display surface, and a supporting base having two sets of bearing elements facilitating a limited degree of rotation of said exhibiting device about the axis of either of said sets of bearing elements, whereby said display surface can be easily viewed from a plurality of directions when the device is operably mounted.

7. A cabinet for electronic equipment comprising a substantially box-like chassis section open on the bottom side thereof, said chassis section being adapted to support a visual display tube and a plurality of associated electronic components, a cover connected to said chassis section and adapted to enclose said tube and those of said components which are externally mounted on said chassis section, and a rectangular base pan adapted to support the equipment from a supporting surface, said pan being pivotally connected along two opposite edges thereof to the corresponding edges of said bottom side of said chassis section by means of two separate individually removable fastening pins, so that upon the removal of one of said pins said chassis section can be internally exposed in at least two operable mounting positions by being pivotally lifted using the other of said pins as a pivot.

8. A cabinet for electronic equipment comprising a substantially box-like chassis section open on the bottom side thereof, said chassis section being adapted to support a visual display tube and a plurality of associated electronic components, a hood-shaped, multi-sided cover having one of its sides of transparent material nearest the display surface of said visual display tube, said cover connected to said chassis section and adapted to enclose said tube and those of said components which are externally mounted on said chassis section, and a rectangular base pan adapted to support the equipment from a supporting surface, said pan being pivotally connected along two opposite edges thereof to the corresponding edges of said bottom side of said chassis section by means of two separate individually removable clasping pins, so that upon the removal of one of said pins said chassis section can be pivotally lifted using the other of said pins as a pivot, said pan also having a substantially peripheral lip telescopically disposed adjacent to the lower edges of the open side of said chassis section, whereby components mounted within said chassis section are provided with a heat-exhaust means and a moisture-protecting means.

References Cited in the file of this patent

UNITED STATES PATENTS

| | | |
|---|---|---|
| 479,938 | Foster | Aug. 2, 1892 |
| 976,572 | Jeffrey | Nov. 22, 1910 |
| 2,172,649 | Claus | Sept. 12, 1939 |
| 2,185,562 | Nielsen | Jan. 2, 1940 |
| 2,337,987 | Galloway | Dec. 28, 1943 |
| 2,368,899 | Taylor | Feb. 6, 1945 |
| 2,543,146 | Bace | Feb. 27, 1951 |
| 2,605,351 | Morris | July 29, 1952 |
| 2,658,101 | Coxe | Nov. 3, 1953 |
| 2,691,560 | Beck | Oct. 12, 1954 |

FOREIGN PATENTS

| | | |
|---|---|---|
| 523,372 | Great Britain | July 12, 1940 |
| 73,910 | Germany | Nov. 15, 1916 |